United States Patent
Knee

(10) Patent No.: US 8,331,689 B2
(45) Date of Patent: Dec. 11, 2012

(54) DETECTING A BORDER REGION IN AN IMAGE

(75) Inventor: Michael James Knee, Petersfield Hants (GB)

(73) Assignee: Snell Limited, Hampshire (GB)

( * ) Notice: Subject to any disclaimer, the term of this patent is extended or adjusted under 35 U.S.C. 154(b) by 923 days.

(21) Appl. No.: 12/417,411

(22) Filed: Apr. 2, 2009

(65) Prior Publication Data

US 2009/0252419 A1    Oct. 8, 2009

(30) Foreign Application Priority Data

Apr. 3, 2008 (GB) .................................. 0806050.1

(51) Int. Cl.
- G06K 9/00 (2006.01)
- G06K 9/48 (2006.01)
- G06K 9/56 (2006.01)

(52) U.S. Cl. .......................... 382/199; 382/181; 382/205

(58) Field of Classification Search .................. 382/181, 382/199, 201, 205

See application file for complete search history.

(56) References Cited

U.S. PATENT DOCUMENTS

| | | | |
|---|---|---|---|
| 6,021,222 A * | 2/2000 | Yamagata | 382/199 |
| 6,482,161 B1 * | 11/2002 | Sumanaweera et al. | 600/454 |
| 2002/0051056 A1 | 5/2002 | Holtslag et al. | |
| 2003/0095710 A1 | 5/2003 | Tessadro | |
| 2005/0094033 A1 | 5/2005 | Schoner et al. | |

FOREIGN PATENT DOCUMENTS

| | | |
|---|---|---|
| EP | 1523175 | 4/2005 |
| WO | 02/05547 | 1/2002 |

OTHER PUBLICATIONS

Gonzalez, R.C., et al., "Digital Image Processing, Passage", Digital Image Processing, Prentice Hall, Upper Saddle River, N.J., XP002291912, ISBN: 9780201180756, pp. 577-585, Jan. 1, 2002.
Gonzalez, R.C., et al., "Digital Image Processing, Passage", Digital Image Processing, Prentice Hall, Upper Saddle River, N.J., XP000962939, ISBN: 9780201180756, pp. 76-77 & 116, Jan. 1, 2002.
Guyon, J.P., et al., "VETOT, Volume Estimation and Tracking Over Time: Framework and Validation", Lecture Notes in Computer Science, Springer Verlag, Berlin, DE, XP002359024, ISSN: 0302-9743, vol. 2879, part 2, pp. 142-149, Jan. 1, 2003.
Zouridakis, G., et al., "Transillumination Imaging for Early Skin Cancer Detection", Biomedical Imaging Lab, Department of Computer Science, University of Houston, Houston, TX, available online at: <http://www.cs.uh.edu/docs/cosc/technical-reports/2005/05_05.pdf>, XP002539353, Mar. 10, 2005.
GB0806050.1 United Kingdom Search Report dated Jul. 23, 2008, 3 pages.
GB0806050.1 United Kingdom Search Report dated Feb. 9, 2009, 2 pages.
EP09157034.1-2218 European Patent Convention Examination Report dated Apr. 20, 2012, 5 pages.

* cited by examiner

*Primary Examiner* — John Strege

(74) *Attorney, Agent, or Firm* — Michael Best & Friedrich LLP

(57) ABSTRACT

Systems and methods for detecting a border region in an image. A blank border in a video picture is determined by summing luminance or other pixel measures in a direction parallel to the border and looking for the maximum gradient of those summed measures in a direction perpendicular to the border. Sensitivity can be enhanced by increasing (relative to other pixels) the gain of pixels around the present pixel value of the border. The location of the maximum gradient may be weighted by other measures before a decision on border location is taken.

10 Claims, 2 Drawing Sheets

DETECTING A BORDER REGION IN AN IMAGE

FIELD OF THE INVENTION

This invention relates to digital image processing, and particularly the detection of blank borders at the edges of television or video images.

BACKGROUND

There are now many different picture width-to-height ratios (aspect-ratios) in use in the field of television and video, and it is frequently necessary for images to be presented on displays having a different ratio from the one for which they were originally intended. This problem is solved by the well-known techniques of aspect-ratio conversion. It is generally highly undesirable for aspect-ratio conversion to change the relative horizontal and vertical proportions of portrayed objects, and so "borders" are often added to television pictures so as to fill parts of the raster which are necessary to fill the display area, but which contain no image content. Examples of this are the well-known "black bands" above and below images shown on displays which are not wide enough; and, "side-curtains" on displays which are not high enough. Borders may also be introduced unintentionally due to incorrect use of aspect-ratio converters, or due to incorrect definition of the active picture area in other video processing operations.

Automatic detection of borders can assist many video and image processing tasks. For example: a process may operate differently in the border areas; or, unnecessary borders, which waste usable picture area, may be removed automatically.

Borders are usually black—which ought to make them easy to detect. However, in practice, the darkest part of the picture may be darker or lighter than the border; and there may be noise present, possibly with different characteristics in the border region and the picture. Thus simple border detection algorithms that identify a defined border colour or luminance value frequently fail to provide acceptable performance.

SUMMARY

The invention consists of novel method and apparatus for the detection of border regions at the edges of scanned images.

In one embodiment a linear boundary between a border region and a picture region within an image is identified as the position of a maximum pixel-value spatial-gradient parameter measured in the direction perpendicular to the said boundary. An appropriate pixel value is taken at each pixel and a spatial gradient may be measured in the direction perpendicular to the boundary, for example by measuring differences between pixels or by applying a spatial filter spanning a group of pixels in a line perpendicular to the boundary, the spatial filter taking weighted contributions calculated to produce a gradient measure. The gradient measure is an attribute of the picture and by looking for a maximum in the gradient measure, a boundary can be identified with far greater reliability than known border detection techniques which seek to identify or assume a defined border colour or luminance value.

Suitably, pixel-values are combined in the direction of the said linear boundary prior to the determination of the said spatial-gradient parameter.

In preferred embodiments the pixel-values are modified by a non-linear function prior to the determination of maximum spatial-gradient. The intention is to improve sensitivity of gradient measurement around the expected pixel value in the border region. The pixel values after non-linear processing remain pixel values continuous variables and will be capable of assuming at least 3, 4 or 5 and preferably many more different values. Whilst the improvement in sensitivity relies upon an estimate of the expected pixel value in the border region, errors in that estimate will not prevent a reliable detection of borders.

Advantageously, the said spatial-gradient parameter is modified prior to the said maximum value determination in dependence upon a parameter that depends upon distance from one edge of the image.

In an alternative embodiment data from two or more images in a sequence of images is combined and a border position for an image in the sequence is detected using the combined data.

In preferred embodiments luminance pixel values are used, though, alternatively, primary colour separation values or colour difference values may be used In another embodiment the absence of borders in an image is determined by finding the positions of horizontal top and bottom border boundaries and vertical left and right side border boundaries according to the positions of maximum pixel-value spatial-gradient parameters, and the absence of borders is detected when all four detected boundaries coincide with the edges of the image.

In one embodiment, the invention provides a method for detecting a linear boundary between a border region and a picture region within an image. The method includes measuring a pixel-value spatial gradient in a direction perpendicular to an edge of the image and identifying a position having the maximum measured pixel-value spatial gradient. The identified position is the linear boundary.

In another embodiment, the invention provides an apparatus for detecting a linear boundary between a border region and a picture region within an image. The apparatus includes a spatial gradient measurement module and a maximum detector module. The spatial gradient measurement module is configured to measure a pixel-value spatial gradient in a direction perpendicular to the said boundary. The maximum detector module configured to receive the spatial gradient measure and to provide a boundary location.

In another embodiment, the invention provides a method for detecting a linear boundary from a plurality of candidate linear boundaries between a border region and a picture region within an image. The method includes measuring a pixel-value spatial-gradient parameter for each candidate linear boundary in a direction perpendicular to the linear boundary, determining for each candidate linear boundary a measure of the size of the border region associated with that candidate linear boundary, and selecting the linear boundary from among the candidate linear boundaries using the measured pixel-value spatial-gradient parameter and the measure of the size of the border region.

In another embodiment, the invention provides a computer readable medium encoded with a plurality of computer executable instructions for detecting a linear boundary between a border region and a picture region within an image. The plurality of instructions including instructions for measuring a plurality of pixel-value spatial-gradient parameters in a direction perpendicular to the boundary, detecting a maximum pixel-value spatial-gradient parameter from the measured pixel-value spatial-gradient parameters, and identifying the boundary as the position of the detected maximum pixel-value spatial gradient.

In another embodiment, the invention provides a computer readable medium encoded with a plurality of computer executable instructions for detecting a linear boundary between a border region and a picture region within an image. The plurality of instructions including instructions for measuring, in the direction perpendicular to the linear boundary, a pixel-value spatial-gradient parameter for a plurality of candidate boundaries, determining for each candidate boundary a measure of the size of the border region associated with that candidate boundary, and selecting the linear boundary from among the candidate boundaries in accordance with the measured pixel-value spatial-gradient parameter and said measure of the size of the border region associated with that candidate boundary.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
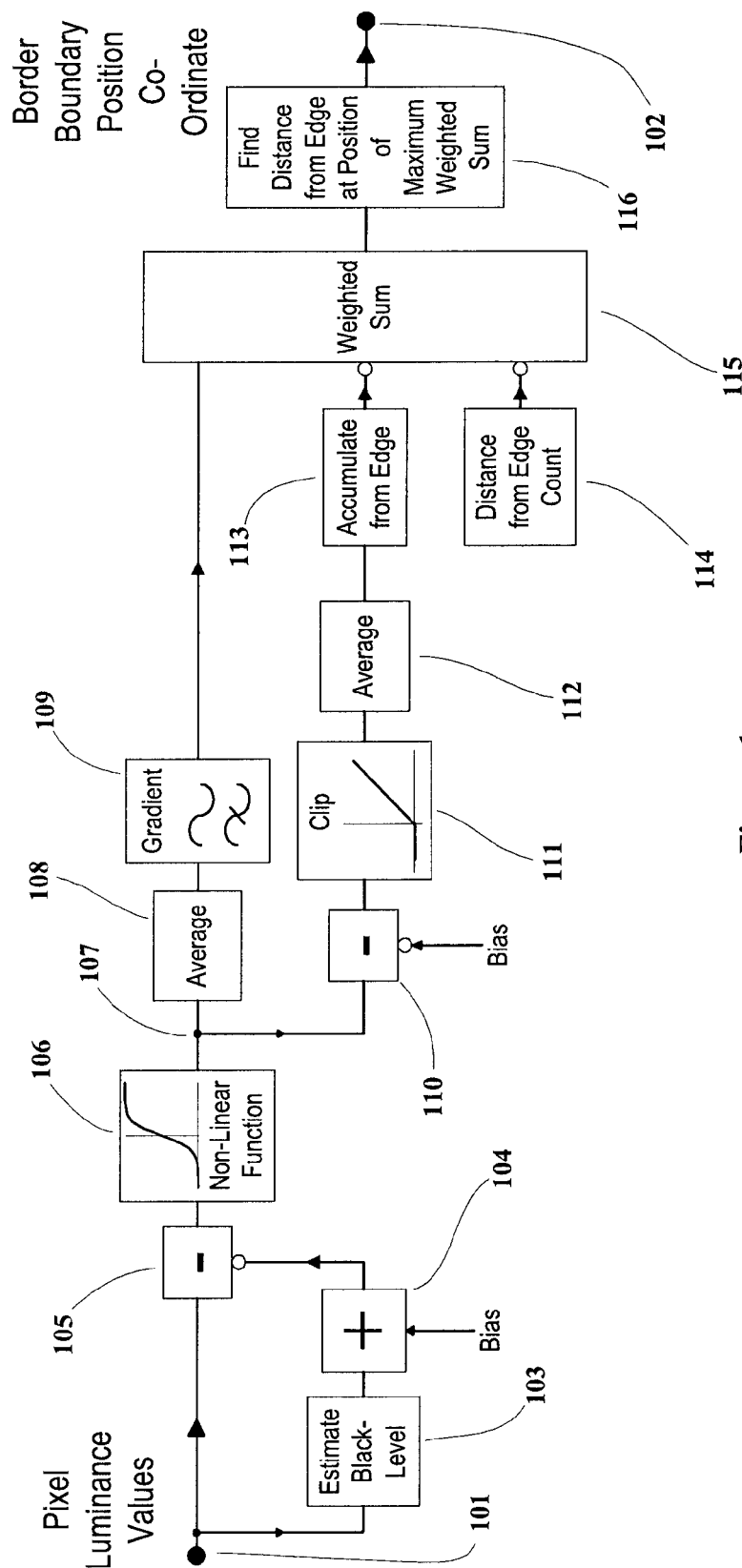
FIG. 1 shows a block diagram of part of a system for detecting rectangular border regions at the edges of a video image according to an embodiment of the invention.

The invention enables horizontal or vertical boundaries between border regions and respective adjacent picture regions to be detected. Pixel-values for at least the whole active image, including areas that may be border regions, are analysed. Typically pixel luminance values are analysed, but other pixel calorimetric parameters may be used. FIG. 1 shows an example in which, luminance values (101) describing the pixels of a raster-scanned image are processed to derive a position co-ordinate value (102) indicative of the likely position of such a boundary.

First the determination of the position of the lower edge of a horizontal boundary at the top of the image will be described. A black-level estimation process (103) forms an estimate of the luminance of the darkest part of the whole image, including the possible border regions. This process will be described in detail below. In the description which follows it will be assumed that the pixel luminance values are represented by 8-bit numbers with nominal black corresponding to a (decimal) value of 16.

Figure 2:
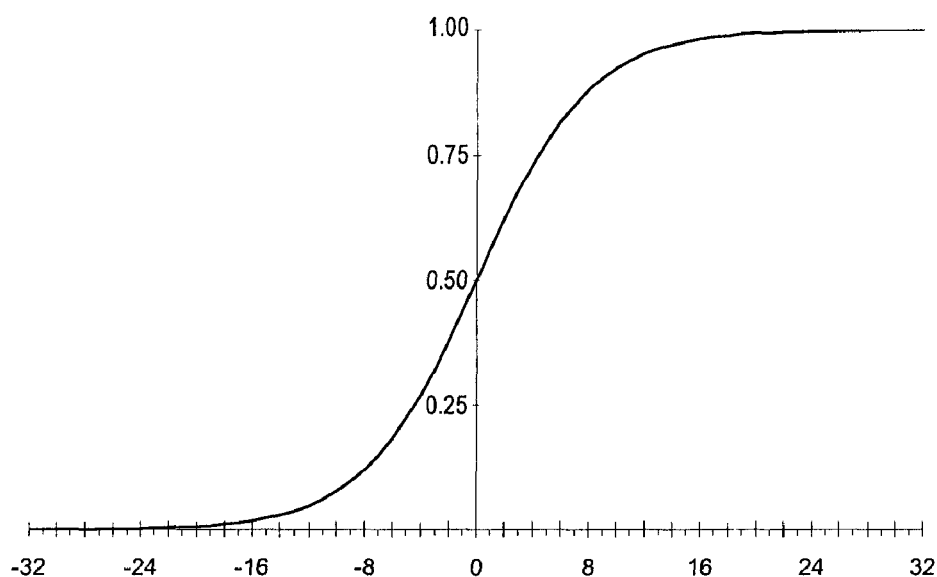
FIG. 2 shows an example non-linear function having maximum slope for an argument of zero and rapidly decreasing slope for higher-magnitude arguments.

The estimated black-level from the estimation process (103) is increased (i.e. made lighter) by the addition of a small constant bias value (8, for example) in an adder (104). The resulting value is subtracted in a subtractor (105) from all of the image pixel luminance values (101). The output from the subtractor (105) is modified by a non-linear function (106) which has a maximum slope for an argument of zero and rapidly-decreasing slope for higher-magnitude arguments. A suitable function is the sigmoid function shown in FIG. 2 which returns values in the range zero to unity.

The combined effect of the subtractor (105) and the adder (104) is to shift the maximum-gain region of the non-linear function (106) so that it applies to luminance values a little above the estimated black level.

The output pixel-values (107) from the non-linear function (106) are averaged across each scan-line of the image in the averager (108), so as to obtain a set of average luminance values, one for each scan-line of the image. These values are applied to a vertical high-pass filter (109), which determines the average vertical luminance spatial-gradient at the vertical position of each line.

A suitable filter is described by the equation:

$$f_j = \tfrac{1}{2}(s_{j+1} + s_j - s_{j-1} - s_{j-2})$$

Where:
$f_j$ is the gradient value at line j;
$s_j$ is the average luminance value for line j; and,
increasing subscript values denote lines further from the top of the image.

Note that the use of average luminance values from four adjacent scan-lines gives some attenuation of noise and, for interlaced images, reduces any interlace-related aliasing.

The two maximum members of the set of spatial-gradient values for all the lines of the image will give a good indication of the locations of the horizontal boundaries between any top or bottom boundaries between the image and any respective top or bottom border regions. However, improved results are obtained by including two additional components in the analysis.

Firstly, a cumulative measure of higher-luminance pixels is derived at each line position. The modified pixel-values (107) that correspond to higher-luminance pixels are identified by applying a negative bias in the subtractor (110) and replacing any resulting negative values by zero in a clipper (111). (A bias value of 0.95 used in conjunction with the non-linear function of FIG. 2 will set to zero contributions from pixels producing an output value less than 11 at the output of the subtractor (105).) The clipped values for each scan-line of the image are averaged over the whole line length in an averager (112), and accumulated in an accumulator (113), so as to obtain a set of accumulated luminance values, one for each scan-line, increasing with distance from the top of the image.

Secondly, a measure of distance from the edge of the image is derived for each line position. This is formed by a counter (114) which simply counts line numbers, the count increasing with distance from the top of the image.

For each scan-line of the image a weighted adder (115) combines:
the spatial-gradient value from the gradient filter (109);
the cumulative higher-luminance measure from the accumulator (113); and,
the vertical position measure from the line counter (114).

The respective higher-luminance contributions and the vertical position contributions to the weighted sum are negative and therefore reduce the spatial-gradient values corresponding to scan-lines further away from the top of the image.

The maximum value in the resulting set of summation values identifies the likely position of a horizontal boundary between a border at the top of the image and the picture information. This maximum value is identified in a process (116) which outputs the corresponding line number as a boundary position co-ordinate (102).

The negative contributions to the weighted sum from the accumulator (113) and the line counter (114) reduce the likelihood of horizontal edges in the picture being wrongly interpreted as borders. The fact that both of these negative contributions increase with distance from the top of the image exploits the fact that narrow borders are more likely to occur than wide borders.

The location of boundary between a horizontal bottom border and picture information can be found in a very similar way. The only difference from the process just described is that the accumulation of higher-luminance contributions in the accumulator (113), and the vertical position measure from the line counter (114), increase with distance from the bottom of the picture.

Analogous processes can be used to detect vertical boundaries between left or right side border regions and picture information. In this case horizontal spatial-gradients are detected in the filter (109); the averaging (108) of the spatial-gradient values and the averaging (112) of the higher-luminance contributions is made over vertical "columns" of horizontally-aligned pixels; and, the line counter (114) is replaced by a pixel-column count increasing with distance from the left edge or right edge of the image (for detection of left and right border boundaries respectively).

It is important to be able to detect the absence of a border. Provided that the edges of the full image area are processed in the same way as the rest of the image, the invention will identify the image edge position as a border boundary position if there is no border. If border boundaries are detected coincident with all four image edges then the absence of borders can be inferred. The correct processing of the image edges can be achieved by artificially adding black pixels outside the edges of the image and processing the enlarged image area. In many cases the image data will include blanking areas around the image and some of these can be processed.

Figure 3:
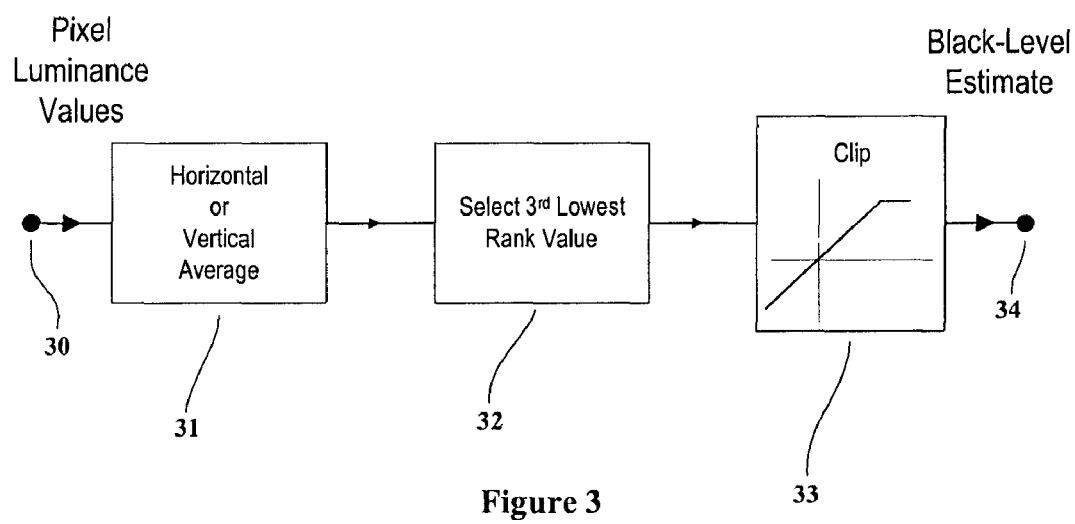
FIG. 3 shows a black-level estimation process according to an embodiment of the invention.

The black-level estimation process (103) operates to detect the lowest luminance value in the whole picture, disregarding transient "undershoots". An example process is shown in FIG. 3. As will be explained below, it is helpful to use slightly different processing depending on whether the resulting black-level value is to be used to locate horizontal or vertical border boundaries.

Referring to FIG. 3, the set of pixel luminance values for the whole image (30) are averaged either vertically or horizontally in the averager (31). A horizontal average, giving one value per scan-line is used when detecting horizontal border boundaries; and, a vertical average, giving one value per column of pixels is used when detecting vertical border boundaries.

The resulting set of average values, either one value per scan-line, or one value per column of pixels, is passed to a rank order filter (32), which selects the third-lowest value from the set. The lowest value and the next-to-lowest value are not used as they are likely to be due to transient undershoots at the two border boundaries, one at each edge of the image area. The selected value output from the rank order filter (32) is limited in a clipper (33) to the highest expected black-level value, typically 32. The limited value is output (34) as the estimated image black-level value which is used in the border edge location process shown in FIG. 1.

Typical video material will have similar border positions in adjacent fields or frames. In some applications it may simplify the processing to use the black-level estimate from a preceding field or frame. The accuracy of the border detection process can be increased by temporally filtering the detected border positions or by temporally filtering one or more of the parameters used in the detection process—for example the weighted sum outputs from the weighted adder (115) shown in FIG. 1. This temporal filtering may be recursive and/or non-linear. A trade-off will usually have to be made between latency and temporal bandwidth. If information about the similarity between adjacent images is available, shot-change information for example, then temporal processing can be modified so as to avoid combining information from unrelated images.

If information about likely border characteristics if available, this can be used to improve the detection process. For example, if it is known that borders are symmetrically arranged, information relating to the detection of one border boundary can be combined with information relating to the detection of another. If it is known that the border has a particular luminance value, the system of FIG. 1 can be modified so that the bias values applied in the adders (104) and the subtractor (110) are chosen so as to increase the sensitivity of the detection process at that luminance value.

The above description assumes that the border boundary directions correspond to the spatial sampling structure of the pixels. If it is known that the boundaries have some other direction then a two-dimensional gradient detection filter can be used, having maximum sensitivity perpendicular to the expected border direction.

The invention can be carried out on pixel-values other than luminance, for example red, green, or blue primary colour separation values, or colour difference values. It may be applied to streaming image data, or to image data files in which the values and locations of pixels can be identified.

The use of "estimate black level" block 103, bias adder 104 and subtractor 105 will be recognised as only one example of techniques for ensuring that the maximum gain range of the non-linear function blocks 106 tracks the measured black level of the image, dynamically.

Similarly, the formation of a weighted sum of the spatial gradient measure and one or more measures which become more negative as the distance increases from the neighbouring picture edge, is only one example of techniques by which the probability of a boundary being detected at a particular spatial gradient measure is reduced as the size of the border that would thus be defined, increases. A look-up table could for example be employed in place of weighted sum 115. In this way (or in other ways) the effect of the measure or measures which vary with the distance from the picture edge could be made non-linear. In any such non-linear relationship with distance, the function may be arranged to track a border size expected from measurement in an earlier image or expected a priori. In place of selecting the maximum value from the output of the weight sum or from the output of look-up table, other techniques may be employed to select a detected boundary from candidate boundaries each having a gradient measure and each having a measure of the size of the border associated with that candidate boundary.

Various features and advantages of the invention are set forth in the following claims.

What is claimed is:

1. A method for detecting a linear boundary between a border region and a picture region within an image, the method comprising:

measuring a pixel-value spatial gradient in a direction perpendicular to an edge of the image;

identifying a position having the maximum measured pixel-value spatial gradient, wherein the linear boundary is the identified position; and modifying a spatial-gradient parameter using a distance parameter based upon the distance from the edge of the image, and determining the maximum measured pixel-value spatial gradient using the modified spatial gradient parameter, wherein the distance parameter is a cumulative sum of high-value pixels.

2. A method according to claim 1, further comprising combining pixel-values in a direction of the linear boundary, and determining a spatial-gradient parameter of the combined pixel values.

3. A method according to claim 1, further comprising modifying pixel-values using a nonlinear function which has a maximum slope around a pixel-value corresponding to the black level of the image and a rapidly-decreasing slope for pixel-values increasingly different from that value, and determining the pixel-value spatial gradient using the modified pixel-values.

4. A method according to claim 1, further comprising combining data from two or more images in a sequence of images, and detecting a border position for an image in the sequence using the combined data.

5. A method according to claim 1, further comprising using one of a pixel luminance value, a pixel primary colour separation value, and a pixel colour difference value to measure the pixel-value spatial gradient.

6. A method according to claim 1, further comprising detecting the absence of borders in an image by
locating a horizontal top boundary, a horizontal bottom boundary, a vertical left boundary, and a vertical right boundary; and
determining the absence of borders when each of the horizontal top boundary, the horizontal bottom boundary, the vertical left boundary, and the vertical right boundary coincide with the edges of the image.

7. An apparatus for detecting a linear boundary between a border region and a picture region within an image, comprising:

a spatial gradient measurement module configured to measure a pixel-value spatial gradient in a direction perpendicular to the said boundary; and
a maximum detector module configured to receive the spatial gradient measure and to provide a boundary location;
wherein the maximum detector module also receives a cumulative sum of high-value pixels and the maximum detector module is configured to identify a maximum pixel-value spatial gradient using a weighted sum of the spatial gradient measure and the cumulative sum.

8. An apparatus according to claim 7, further comprising an averager module configured to combine pixel-values in the direction of the said linear boundary prior to the determination of the spatial gradient.

9. An apparatus according to claim 7, wherein data from two or more images in a sequence of images is combined and a border position for an image in the sequence is detected using the combined data.

10. A non-transitory computer readable medium encoded with a plurality of computer executable instructions for detecting a linear boundary between a border region and a picture region within an image, the plurality of instructions including instructions for:
measuring a plurality of pixel-value spatial-gradient parameters in a direction perpendicular to the boundary;
detecting a maximum pixel-value spatial-gradient parameter from the measured pixel-value spatial-gradient parameters; and
identifying the boundary as the position of the detected maximum pixel-value spatial gradient;
further comprising modifying a spatial-gradient parameter using a distance Parameter based upon the distance from the edge of the image, and
determining the maximum measured pixel-value spatial gradient using the modified spatial gradient parameter,
wherein the distance parameter is a cumulative sum of high-value pixels.

* * * * *